United States Patent [19]

Weimer

[11] 3,715,485

[45] Feb. 6, 1973

[54] RADIATION SENSING AND SIGNAL TRANSFER CIRCUITS

[75] Inventor: Paul Kessler Weimer, Princeton, N.J.

[73] Assignee: RCA Corporation

[22] Filed: Oct. 12, 1971

[21] Appl. No.: 188,183

[52] U.S. Cl. .........178/7.1, 178/DIG. 29, 250/220 M, 340/166 R

[51] Int. Cl. ..............................................H04n 5/30

[58] Field of Search.....178/7.1, DIG. 29; 250/211 R, 250/211 J, 220 M; 340/166 R, 173 LT

[56] References Cited

UNITED STATES PATENTS

| | | | |
|---|---|---|---|
| 3,390,273 | 6/1968 | Weckler | 250/211 J X |
| 3,435,138 | 3/1969 | Borkan | 250/211 J X |
| 3,562,418 | 2/1971 | Glusick et al. | 178/7.1 UX |
| 3,624,609 | 11/1971 | Weckler | 340/166 |

*Primary Examiner*—Robert L. Richardson
*Attorney*—H. Christoffersen

[57] ABSTRACT

An array of radiation sensing elements such as photodiodes and a corresponding number of charge storage means, each associated with a different sensing element. A charge limiting circuit limits to a given level the maximum charge which may be accumulated by any storage means. The charge in a row of storage means may be transferred to an output register by concurrently: (a) disconnecting the limiting circuit from the row of storage means, (b) enabling a set of charge transfer gates between the row of storage means and the register, and (c) shifting the voltage levels at the row of storage means.

12 Claims, 7 Drawing Figures

INVENTOR.
PAUL K. WEIMER
BY H. Christoffersen
ATTORNEY

INVENTOR.
PAUL K. WEIMER
BY H. Christoffersen
ATTORNEY

INVENTOR.
PAUL K. WEIMER
BY
H. Christoffersen
ATTORNEY

INVENTOR.
PAUL K. WEIMER
BY H. Christoffersen
ATTORNEY

INVENTOR.
PAUL K. WEIMER
BY H. Christoffersen
ATTORNEY

INVENTOR.
PAUL K. WEIMER
BY
H. Christoffersen
ATTORNEY

RADIATION SENSING AND SIGNAL TRANSFER CIRCUITS

BACKGROUND OF THE INVENTION

The photoresponsive elements of an integrated circuit image sensor may be subjected to wide variations of light intensity. Under conditions of high illumination, an excess amount of charge may be produced at the locations receiving the light and the excess charge may spread from the element or elements illuminated to adjacent elements. For example, the light from a bright spot falling on one element of an image sensor may cause excess charge produced at the one element to spread to many elements. The bright spot is thus erroneously displayed as a line in the reproduced image.

SUMMARY OF THE INVENTION

A radiation sensing element having charge storage means associated therewith is coupled to an output circuit by means of a normally disabled gate circuit. Charge limiting means are coupled to said element for limiting the amount of charge which is stored in said charge storage means.

BRIEF DESCRIPTION OF THE DRAWINGS

In the accompanying drawings, like reference characters denote like components.

DETAILED DESCRIPTION OF THE INVENTION

Figure 1:
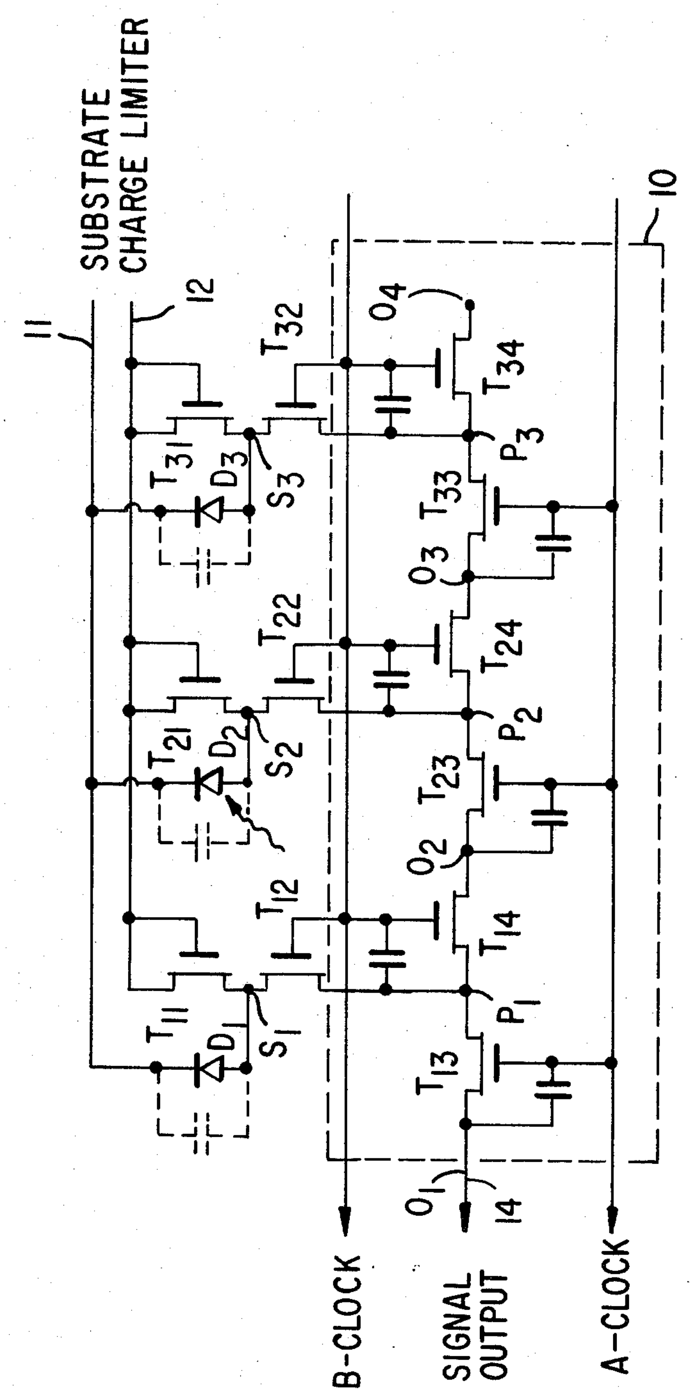
FIG. 1 is a schematic diagram of a circuit of one line of an image sensor array embodying the invention.

FIG. 1 shows one line of an image sensor array in which the photodiodes (D1, D2, D3) are connected to the charge transfer bucket brigade register 10 by means of gating transistors (T12, T22, T32). Each photodiode is connected at its anode to a different charging node (S1, S2, S3, respectively) and at its cathode to the common substrate line 11. Each diode exhibits a capacitance, shown in phanton view, across the diode junction. The diodes are operated in the reverse biased mode (i.e., the cathode is always at a more positive potential than the anode). They function as current generators producing a (photo) current from cathode to anode proportional to the incident light. The currents produced by the diodes are integrated by the respective diode capacitances and cause the potentials at the charging nodes (S1, S2, S3) to rise.

Each one of the "limiting" transistors (T11, T21, T31) is connected at its source electrode to a different charging node (S1, S2, S3, respectively) and at its drain and gate electrode to charge limiter line 12. Transistors T11, T21, T31 are operated as MOS diodes (gate connected to drain) and depending on the potential applied to line 12, "clamp" or "limit" the potential developed at nodes S1, S2, S3. Each one of the "-gating" transistors (T12, T22, T32) is connected at its source to the anode of a different diode (S1, S2, S3, respectively) at its drain to a different input point (P1, P2, P3, respectively) of the scanning register 10 and at its gate to the B-clock bus line.

The bucket brigade shift register 10, three stages of which are shown in FIG. 1, includes two transistors per stage. Transistors T13, T14, T23, T24, T33, T34 have their source-drain paths connected in series. The gates of every other transistor (the odd numbered transistors) are connected in common to a first clocking signal (A-clock) and the gates of the remaining transistors (the even numbered transistors) are connected in common to a second clocking signal (B-clock). Between the gate and drain of each transistor is a capacitor which AC couples the clock signal to the drains of the transistors. This register, 10, operates on the principle of charge transfer producing a serial stream of output signals at output terminal 14.

Figure 2:
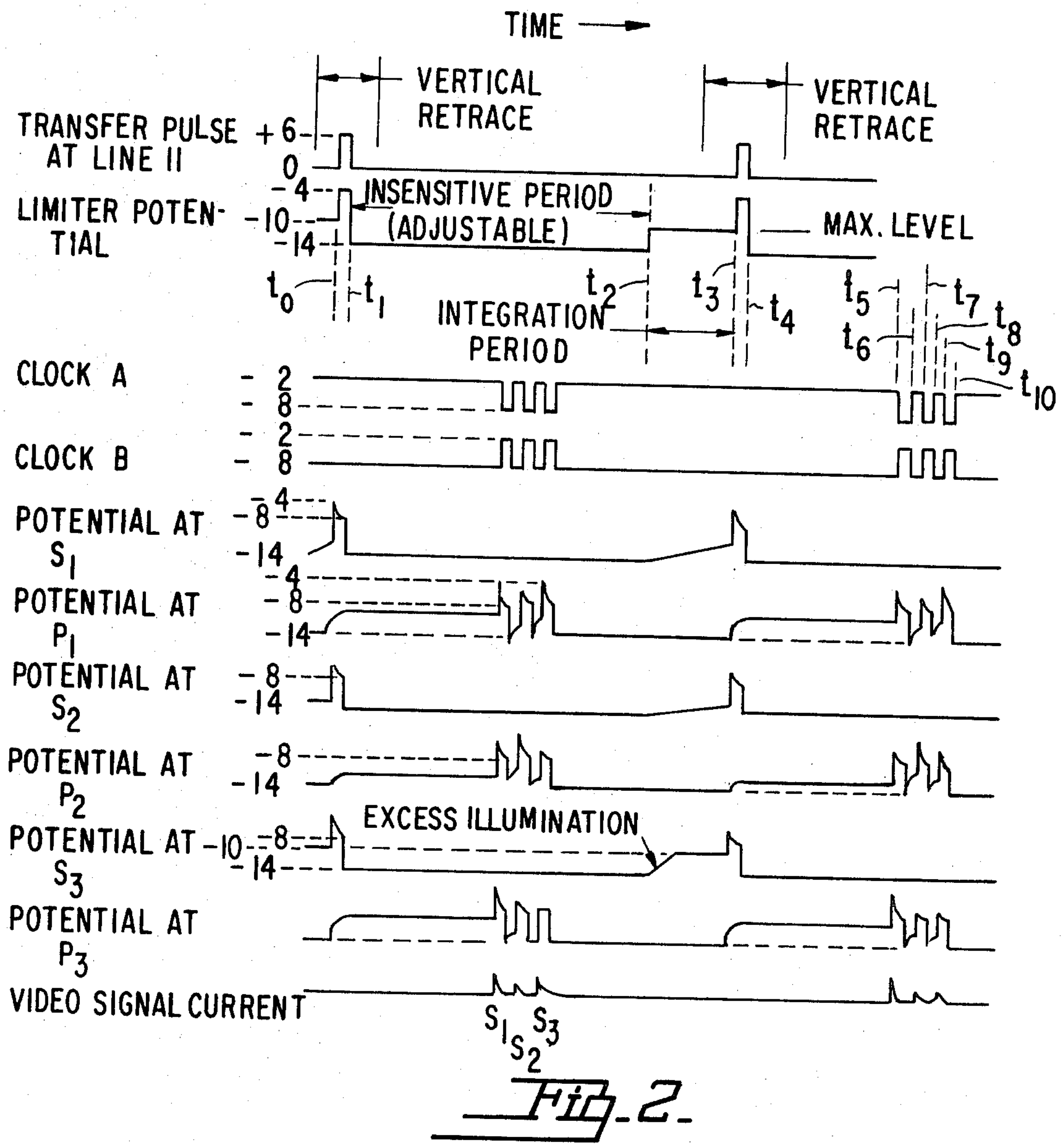
FIG. 2 is a drawing of some of the waveforms associated with the circuit of FIG. 1.

In the discussion which follows of the operation of the circuit of FIG. 1, both FIGS. 1 and 2 should be referred to. The polarity of the waveshapes in the latter figure is for transistors of P-conductivity type (although the circuit would be equally operative with N-type transistors). Assume as shown in FIG. 2, that at time $t_1$ a potential of −14 volts is applied to limiter line 12. This potential is sufficient to forward bias transistors T11, T21, and T31 and to clamp nodes S1, S2, and S3 to approximately −14 volts. In practice, the potential at nodes S1, S2, and S3 will be slightly more positive than −14 volts due to the gate-to-source threshold potential ($V_T$) of the clamping transistors; however, this slight voltage offset will be ignored and assumed to be zero volts for purposes of this discussion. With transistors T11, T21, and T31 forward biased, any photo currents flowing through photodiodes D1, D2, and D3 into node S1, S2, or S3 are shunted through these transistors to line 12. Therefore, no charge is accumulated at nodes S1, S2, or S3 during this period, and as indicated in FIG. 2, this is an insensitive period. This period is adjustable being dependent purely on the potential applied to line 12 and may be varied depending on incident light. In fact, it would normally be made dependent on the ambient light level or on the light intensity of the scene being imaged. Thus from time $t_1$ to time $t_2$, no charge is accumulated at the anodes of the diodes.

At time $t_2$ the limiter potential (i.e., the potential applied to line 12) goes from −14 volts to −10 volts. This cuts off the limiting transistors (T11, T21, T31) since their source potential (nodes S1, S2, and S3, respectively) is at −14 volts due to the charge storage action of the junction capacitances while their gate potential is 4 volts more positive at −10 volts. With the limiting transistors cut off, charge can now accumulate at nodes S1, S2, and S3. This is shown in FIG. 2 where from time $t_2$ to time $t_3$, the potential at S1, S2, and S3 rises proportionately to the light impinging on its associated diode.

When the potential at a charging node rises above −10 volts (as shown for S3), the limiting transistor associated therewith begins to conduct limiting the potential to −10 volts. This demonstrates the limiting function of the limiting circuitry. Thus, the limiting transistors are rendered nonconducting until the potential at nodes S1, S2, and S3 exceeds −10 volts.

The photo signals developed at nodes S1, S2, and S3 are transferred to register 10 through gating transistors T12, T22, and T32 when a positive-going transfer pulse is applied to the substrate line 11. This is illustrated in FIG. 2 where from time $t_3$ to $t_4$ (a period defined in TV applications as the vertical retrace or fly back time) a pulse of +6 volts amplitude (0 to +6 volts) is applied to the substrate line 11. Concurrently, the potential applied to limiter line 12 is raised from −10 volts to −4 volts to prevent the limiting transistors (T11, T21, T31) from being turned on. The 6 volt pulse applied to line 11 is AC coupled through the junction capacitance of diodes D1, D2, and D3 and causes the potential at nodes S1, S2, and S3 to rise by 6 volts. Since the initial node potentials (the potentials just prior to time $t_3$) are between −14 volts (zero signal) and −10 volts (maximum signal), these potentials rise to between −8 volts (zero signal) and −4 volts (maximum signal). Recalling that the signal applied to line 12 raises its potential to −4 volts, it is clear that the limiting transistors are maintained in the cut-off condition.

The gates of gating transistors T12, T22, and T32 are connected to the B-clock bus which is maintained from time $t_1$ to $t_5$ at −8 volts. This prevents any signal present at nodes S1, S2, and S3 which is more negative than −8 volts from turning on the gating transistors. With the application of the transfer pulse, the sources are driven positive with respect to their gates and signals present at the nodes flow through the source-drain paths of the gating transistors to input points P1, P2 and P3. The photo signals are thus transferred from the charging nodes to register 10 by means of the transfer pulse. This is illustrated in FIG. 2 where from time $t_3$ to $t_4$ the potentials at points P1, P2, and P3 increase while the potentials at S1, S2, and S3 decrease due to the transfer of the signals from the latter to the former. The gating transistors cut off when substantially the full signal has been transferred and their sources are discharged to −8 volts.

At time $t_4$, the transfer pulse terminates (line 11 goes from +6 volts to zero volts) and the potential applied to charge limiter line 11 goes from −4 volts back to −14 volts. The negative-going transition of the transfer pulse on line 11 causes the gating transistors (T12, T22, T32) to be cut off since their sources (connected to S1, S2, and S3, respectively) are driven 6 volts more negative (from −8 volts to −14 volts) while their gates are at −8 volts maximum. The −14 volts applied to the charge limiter line 12 establishes the same conditions which existed following time $t_1$ as described above.

At time $t_4$, the transfer pulse goes to zero and the register 10 is isolated from the photoresponsive elements. The potential present at junction points P1, P2, and P3 may now be transferred along register 10 by means of clocking pulses A and B as illustrated in FIG. 2 from time $t_5$ to $t_{10}$. When the A-clock goes negative and the B-clock goes positive, the odd numbered transistors are turned on transferring the charge present at their sources (P1, P2, P3) to their drains (O1, O2, O3). When the A-clock goes positive and the B-clock goes negative, the even numbered transistors are turned on transferring the charges from their sources (O2, O3, O4) to their drains (P1, P2, P3). Therefore, the charges initially present at junction points P1, P2, and P3 are serially shifted, each half cycle, to the succeeding nodes downstream. The signals then appear, in turn, at signal output terminal 14 until the register is fully read out.

The circuit of FIG. 1 thus describes a new type of charge-transfer sensor in which the light-sensitive photodiodes are not an integral part of the charge-transfer registers. The gating transistors (T12, T22, T32) are provided to disconnect the photodiodes from the output register at all times except when charge is to be transferred from the sensing elements to the register. This permits the registers to be shielded from the light and offers several important advantages in the design of solid state sensors. First, it eliminates the effects of image smearing and overloading of the register by excess illumination. Secondly, it permits the use of a variety of systems for storage and scanning which were not possible with earlier sensors.

The separation of the photodiodes from the scanning registers, as described above, permits fairly precise control of the signal which enters the register. The "limiting" circuit which includes transistors T11, T21, T31, enables the maximum signal level to be fixed at some desired level, and the adjustment of the light integration period permits the effective circuit sensitivity to be varied over a wide range.

The circuit shown in FIG. 1 is applicable for either a single-line sensor or for a sensor array in which each row or column incorporates its own charge transfer register. Considerable latitude is possible in the design of the gating transistors for transferring the charge from the photosensor element to the registers. The transfers can be carried out simultaneously for all elements at once or sequentially a line at a time. Instead of the transfer pulse being applied to the substrate line, an alternate transfer mode could be used. The gates of the gating transistors (T12, T22, T32) could be connected to a separate conductor, that is, a conductor other than the B-clock line. A negative pulse could then be selectively applied to the conductor to turn on the gating transistors and transfer the information from the charge nodes to the register. This would permit the transfer of the photo signals to the scanning register independently of the clocking pulses.

Figure 3:
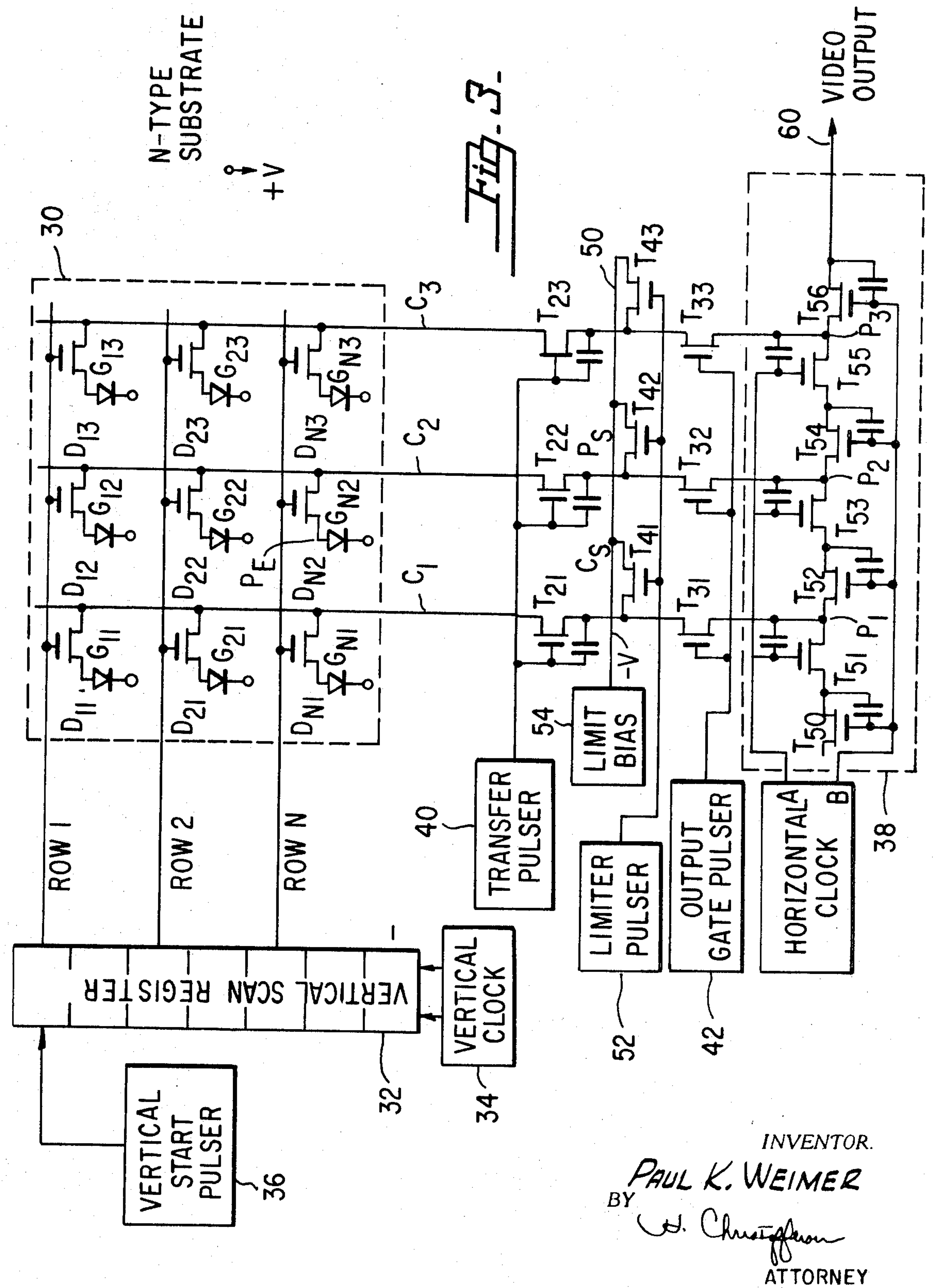
FIG. 3 is a schematic diagram of an image sensor array embodying the invention.

The use of limiting circuitry in the manner proposed is also applicable to other types of sensors including *x–y* sensors which are scanned by means of peripheral charge transfer circuits. In FIG. 3 limiting circuitry is coupled to a matrix array 30 to alloy unwanted charge arising from excess illumination to be shunted to ground thereby preventing the output register from being overloaded.

The circuit includes photoresponsive array 30 shown having three columns (C1, C2, C3) and three rows (Row 1, Row 2, Row N). At the intersection of each row and column, there is an element selecting transistor (G11, . . . GN3) connected to a photodiode D11, . . . DN3). Each selecting transistor is connected at its gate to a row conductor, at its drain to a column conductor, and at its source to the anode of a photodiode. The cathode of all the photodiodes are connected in common to the substrate to which is applied a potential of sufficient amplitude to maintain the diodes reverse biased.

Each row of the array is connected to an output of vertical scan register 32. The vertical register is clocked at a rate determined by the vertical clock 34 but the periodicity and shape of the pulses is controlled by the vertical start pulser 36 which in turn may be responsive to a light signal.

Each column of array 30 is coupled to an input node (P1, P2, P3) of the output register 38 by means of two series connected transistors—such as T21, T31, and so on. For example, column C2 is connected to node $P_2$ by the series connected source-drain paths of transistors T22 and T32. The gates of the storing transistors T21, T22, and T23 are connected, in common, to transfer pulser 40 and the gates of the gating transistors T31, T32, and T33 are connected, in common, to output gate pulser 42.

The source-drain paths of charge limiting transistors T41, T42, T43 are connected between each column and the limit bias line 50. The gates of these transistors are connected to limiter pulser 52. The bias line 50 is returned to limit bias source 54 which maintains bias line 50 at a potential of −V volts.

Generally, the total light integration period (i.e., the period during which the photodiodes are electrically disconnected from the columns) can be varied from a line-time (defined as the time to scan out one row) up to a full frame time (defined as the time to scan out all the rows of the matrix array) by adjusting the form of the row select pulse (line 2, FIG. 4), applied to the vertical scan register 32. This adjustment is equivalent to an electronic iris in the camera. For very bright scenes, the integration time can be reduced thus permitting the sensor to operate satisfactorily over a wide range of illumination levels.

Figure 4:
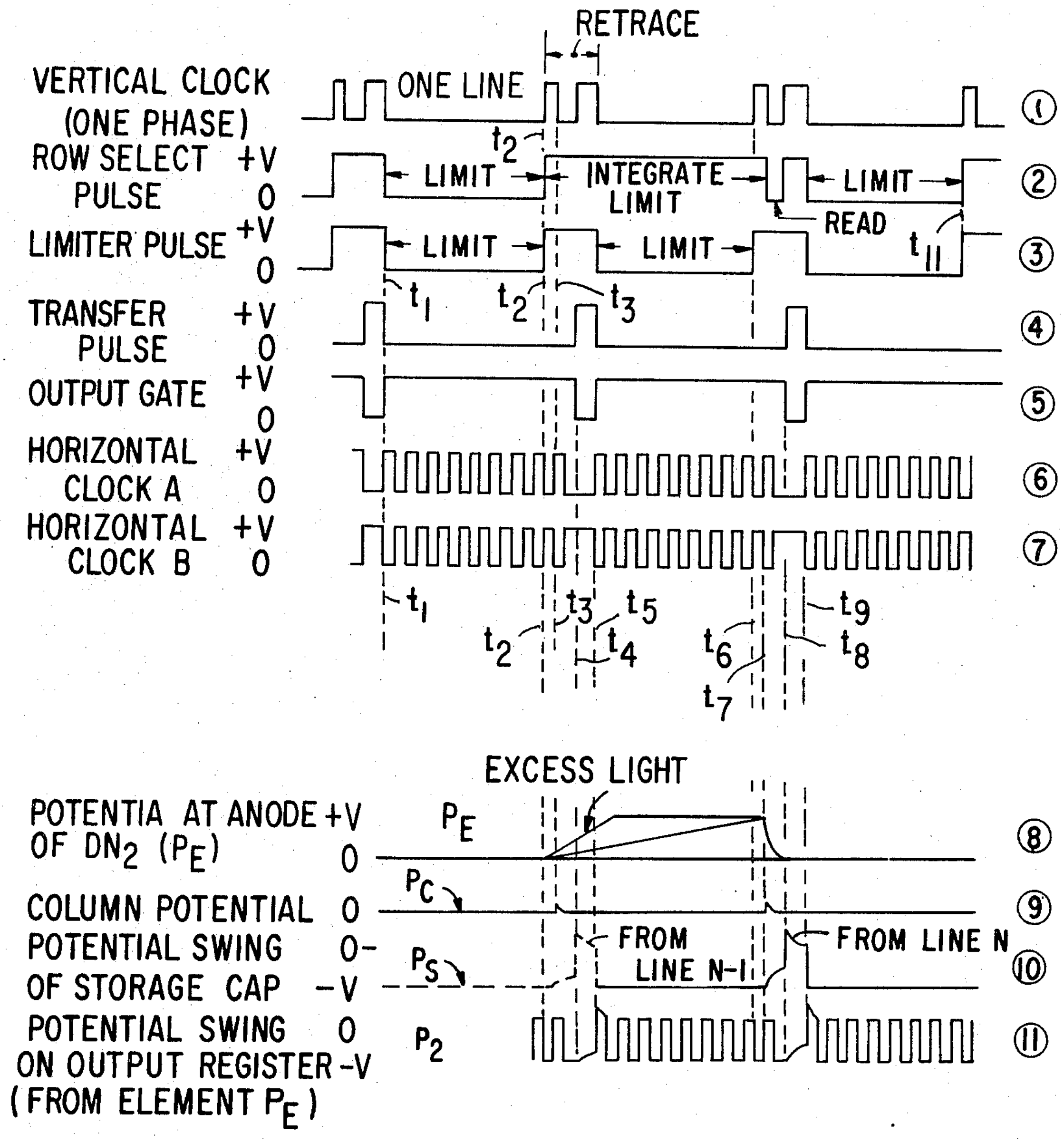
FIG. 4 is a drawing of some of the waveforms of FIG. 3.

The polarity of the waveforms shown in FIG. 4 assume the transistors of FIG. 3 to be of P-type conductivity (N-type substrate) but again N-type transistors on a P-type substrate also would by suitable. The vertical scan generator 32 can be a bucket-brigade shift register or any conventional type of register.

Because of the complex waveform of the scan pulses required for operation, it is preferable that the vertical scan generator include two complete stages per row with alternate stages connected to successive rows. By using an asymmetric vertical clock waveform such as shown in line 1 of FIG. 4, it is possible to transmit alternate short and long duration pulses in any arbitrary sequence depending upon the shape of the vertical input pulse.

In operation of the circuit of FIG. 3, a row select pulse, as shown by line 2 of FIG. 4 progresses along the register 32 causing successive rows to be pulsed. This particular waveform which causes an integration period of one-line time is formed by two types of pulses which are concurrently sent down the vertical register. One pulse of shorter duration turns on the row conductors during the read (or discharge) period, and the second group of pulses (the "limit" portion of the row select pulses) turns on the row conductors during the limit period. By modification of the relative number and timing of the limit pulses, the integration time for every element can be varied.

The particular signals shown permit the read pulse always to occur during a retrace period (which in TV application is the horizontal fly-back time), and the limit pulse to occur during the normal scanning period.

During the limit portion (e.g., time $t_1$ to $t_2$) of the row select pulse, the selecting transistors of the row to which the pulse is applied are turned on (zero volts applied to their gates). Concurrently, a limiter pulse (line 3) of zero volts amplitude is applied to the limiting transistors (T41, T42, T43) and a transfer pulse having zero volts amplitude (line 4) is applied to the storing transistors (T21, T22, T23). Therefore, during the limit period, any photo current generated by a photodiode whose selecting transistor is turned on flows through the selecting transistor down its corresponding column and through the source-drain paths of the corresponding storing and limiting transistors to line 50 which connects to limit bias supply 54.

The limit bias supply clamps line 50 to a negative potential (−V volts) and also serves to collect unwanted photo current arising from light falling on the columns which may be somewhat photosensitive. This circuit also prevents carryover of charge from one line to the next when and if a column is not fully discharged.

From time $t_2$ to $t_7$ the row select pulse (line 2) goes to +V volts cutting off the selecting transistors. The photodiodes of that row now integrate the incident light and the potential at the anode of the diodes arises correspondingly as is illustrated in line 8 of FIG. 4 for element DN2.

Note, however, that during the light integration period if the potential at a node such as $P_E$ exceeds +V volts, then the selecting transistor (e.g., GN2) conducts and current flows through transistors T22 and T42 to the limit bias source 54. This limits the maximum signal potential that can be developed at the anode of the photodiode.

From time $t_6$ to $t_9$ the limiter pulse (line 3 of FIG. 4) goes to +V volts turning off the limiting transistors during the read out of the elements. The shunt path provided by these transistors is thus open circuited for the time $t_6$ to $t_9$ interval.

At time $t_7$ the row pulse goes to zero volts turning on the selecting transistors associated with that row. Note that at this time, the transfer pulse applied to the gates of the storing transistors is still at zero volts and the storing transistors can conduct. Note that their drains (e.g., $P_5$) are at −V volts due to both the limit bias potential or the AC coupling of the negative going transition of the transfer pulse. Thus at time $t_7$ the information stored at the anodes of the photodiodes is discharged through the selecting transistors into the columns (See line 8). The signals continue to flow through the source-drain paths of the storing transistors causing the potential at their drains (e.g., $P_5$ on line 10) to rise.

At time $t_8$ the transfer pulse goes from zero to +V volts turning off the storing transistors while simultaneously raising the potential at their drains by +V volts. Concurrently, at time $t_8$ the output gate pulse applied to the gates of the gating transistors goes from +V volts to zero volts. Any photo signal at the drains of the storing transistors which is the source of the gating transistors (e.g., $P_5$) is raised above zero volts causing signal flow through the gating transistors and an increase in charge at the input node (e.g., $P_2$) of the output register 38. Signal flows through the gating transistors until their source potential decreases to zero volts.

At time $t_9$ the transfer pulse returns to zero volts in a direction to turn on the storing transistors and causing the drains of the storing transistors to go to −V volts. Concurrently, the limiter pulse as well as the row select pulse applied to the same or another row goes to zero volts. Also, the output gate pulse goes to zero volts cutting off the gating transistors and electrically disconnecting the output register 38 from the rest of the image sensor circuitry.

The A and B horizontal clocks cause the signals transferred to the input nodes of the register to be serially advanced producing video output signals at terminal 60.

Figure 5:
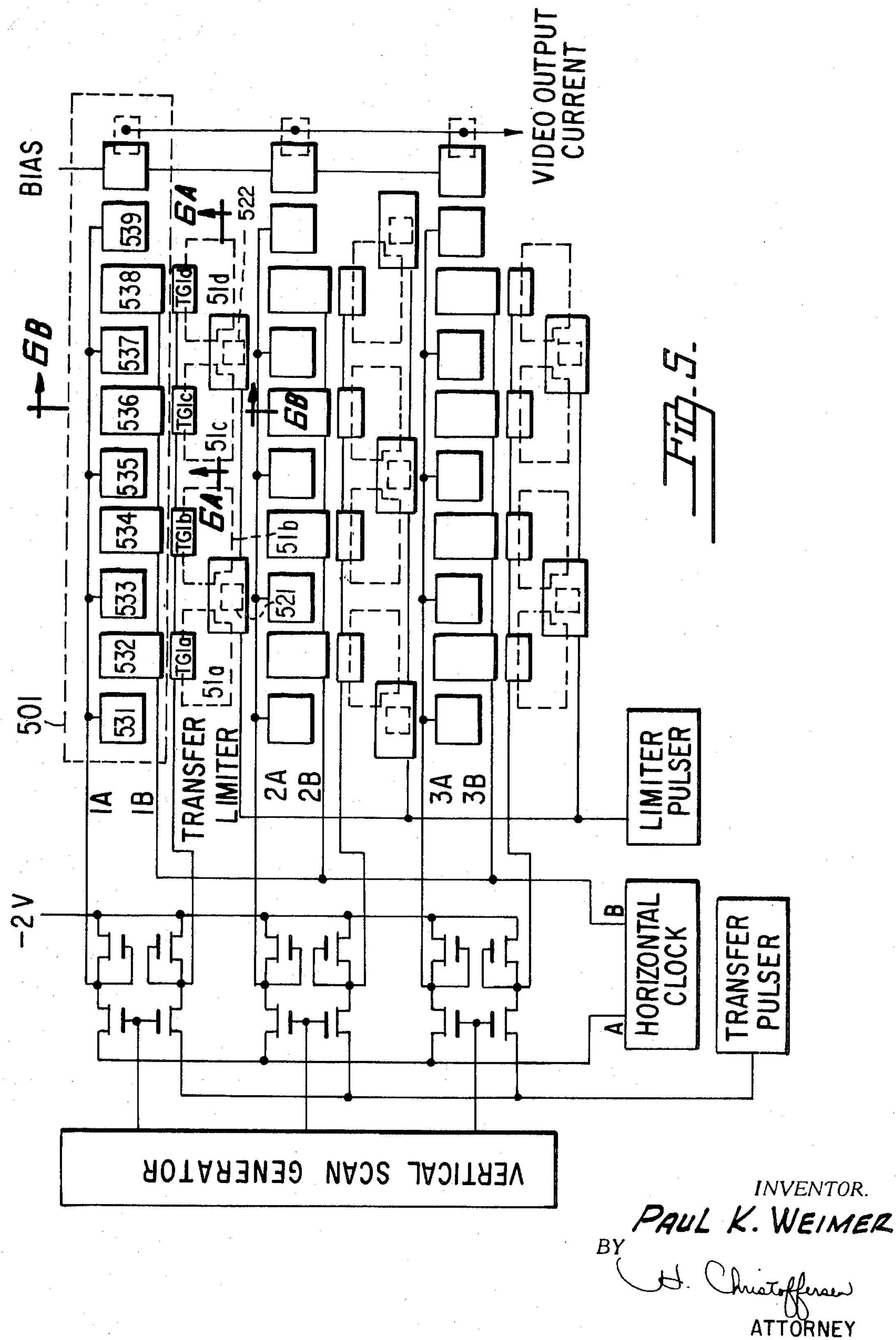
FIG. 5 is a top view of the metallization pattern of a charge-coupled circuit embodying the invention.

The limiting circuits described here can also be used in conjunction with charge-coupled registers as well as bucket brigades. FIG. 5 shows a semi-schematic layout for an image sensor array in which the diffused photodiodes such as 51*a*, 51*b*, 51*c*, 51*d* along each row are coupled via transfer gates, such as TG1*a*, TG1*b*, TG1*c*, TG1d to a charge-coupled register 501.

Figure 6A:
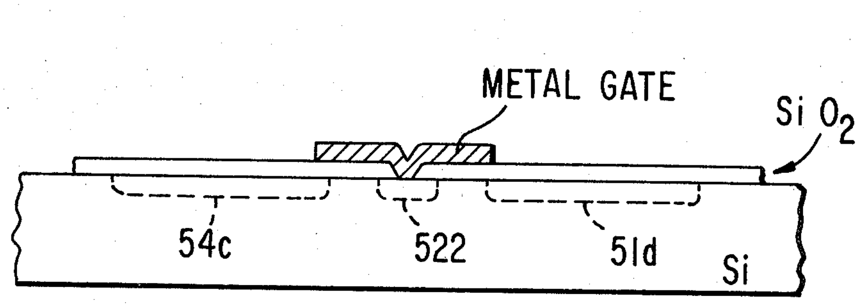
FIGS. 6A and 6B are cross-sections of parts of the circuit of FIG. 5.

Limiting action is obtained in the same manner as described in FIGS. 1 and 2 for a bucket brigade sensor. The diffused electrodes such as 521, 522 with overlapping gates act as MOS diodes which limit the charging action of the light falling on the photodiodes. The cross section of this section of the circuit is shown in FIG. 6A. The MOS gates are connected to an external limiter pulser which is activated in the same manner as described in FIG. 2.

Figure 6B:
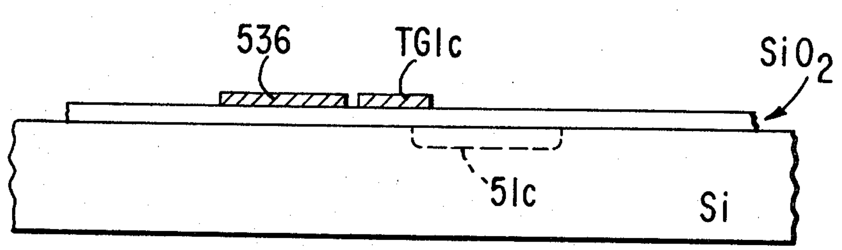

At the end of each integration period, the transfer gate (e.g., TG1*a*, TG1*b* . . . ) are pulsed negatively (for a p-channel device) to allow holes to be transferred from the photodiodes to the register. FIG. 6B details how photodiode 51*c* would be coupled via transfer gate TG1c to the region underneath electrode 536. The charge-coupled register consists of a series of closely spaced electrodes such as electrodes 531 through 539 which are separated from the semiconductor surface by means of a thin $SiO_2$ layer. The register electrodes could be connected to either two or three-phase clocks, as described by Boyle and Smith in IEEE Spectrum, in their article entitled, "Charge Coupled Devices—A New Approach to MIS Device Structures." Two phase electrodes, illustrated in FIG. 5, require that the oxide under each electrode must vary in thickness across the width of the electrode or that there be a similar gradient in doping of semiconductor under the oxide in order to establish the direction in which the charge will be transported when the clock is activated. The process by which charge is transferred along the surface of the semiconductor as clock voltage are applied to the overlying electrodes is described in the above-cited article and need not be repeated here.

The overall operation of a sensor of this type is similar to the operation of the bucket brigade sensor given in FIG. 2. Following the transfer of holes from the photodiodes to the register by application of the transfer pulse to the transfer gates the horizontal A-clock is turned on and the charges are transferred along the row to an output electrode where the video signal is produced. The horizontal B-clock need not be gates since charge is not transferred unless both clocks are in operation.

In the example shown in FIG. 5, a vertical scan generator connected to MOS gates serves to turn on the transfer pulse and the horizontal clock pulses for each row in sequence. The same sensor structure with separate photodiodes and limiting electrodes could be used in an array in which the charge-coupled registers transfer the charges simultaneously along the columns to a common horizontal output register. An advantage of using separate photodiodes in this case is that an additional storage area does not need to be provided on the chip for conversion from parallel-to-series scanning, as is the case when the charge-coupled register itself is illuminated.

Although the present disclosure has emphasized photodiode sensor elements as the preferred form, it should be pointed out that other types of sensors could be used in conjunction with charge transfer scanning. These include the use of photoconductors and phototransistors. The diffused photodiode could also be replaced by a separate sensor electrode which formed a photosensitive depletion layer at the surface of the semiconductor. Charge accumulating under this sensor electrode due to the action of light could then be transferred by charge-coupling into a charge coupled register.

What is claimed is:

1. In combination:

a radiation sensing element;

charge storage means associated with said element for receiving and storing a charge proportional to the radiation reaching said element;

charge limiting means coupled to said element for limiting the amount of charge stored at said charge storage means to a predetermined level;

an output circuit;

normally disabled gate circuit means coupled between said charge storage means and said output circuit; and means for concurrently disconnecting said charge limiting circuit from said charge storage means and enabling said gate circuit means.

2. In the combination as set forth in claim 1, further including means for shifting the voltage level at said storage means when said charge limiting circuit is disconnected from said storage means.

3. In the combination as set forth in claim 2 wherein said charge limiting means includes means for preventing the accumulation of charge during a first time interval and for limiting the maximum amount of charge accumulated during a second time interval.

4. The combination comprising:

photoresponsive means for producing a flow of charge in response to incident light; storage means associated with said photoresponsive means for storing the charge produced thereby;

an output circuit;

charge transfer circuit means coupled between said storage means an said output circuit for transferring the charge in said storage means to said output circuit in response to a control signal; and limiting means coupled to said photoresponsive means for preventing the accumulation of charge during a first time interval and for limiting the maximum amount of charge accumulated during a second time interval.

5. The combination as set forth in claim 4 wherein said photoresponsive means comprises a diode having an anode and cathode and said storage means comprises the capacitance between said anode and cathode exhibited by said diode.

6. The combination as claimed in claim 5 wherein said output circuit and said charge transfer circuit are of the bucket brigade type.

7. The combination as claimed in claim 5 wherein said output circuit and said charge transfer circuit are of the charge coupled type.

8. The combination comprising:

photo responsive means for producing a flow of charge in response to incident light;

charge storage means associated with said means for storing said charges and thereby developing a potential corresponding to the accumulated charge;

charge transfer circuit means, including the source-drain path of at least one gating transistor, coupled between said photoresponsive means and an output register for selectively transferring said accumulated charges to said output register; and limiting means coupled to said photoresponsive means for preventing the accumulation of charge during a first time interval and for limiting the maximum level of said potential due to the accumulation of said charges during a second time interval.

9. The combination as claimed in claim 8 wherein said photoresponsive means is a photodiode having its cathode connected to a first terminal and its anode connected to a second terminal;

wherein said limiting means includes a limiting transistor having its source connected to said anode and its gate and drain connected to a third terminal; and wherein said limiting means also includes means for during said first time interval applying a first potential to said third terminal for causing said limiting transistor to conduct for preventing the accumulation of charge at the anode of said photodiode and for during said second time interval applying a second potential to said terminal for preventing the conduction of said transistor until the potential at said anode exceeds said second potential.

10. The combination as claimed in claim 9 wherein said gating transistor of said charge transfer means is connected at its source to said anode, at its drain to an input node of said output register and at its gate to a source of pulses.

11. The combination as claimed in claim 10 further including means for applying a pulse of given amplitude to the cathode of said photodiode whereby the pulse is coupled through the reverse biased junction of the diode for causing its anode potential to rise; and means for concurrently increasing the potential at said third terminal an amount equal to said given amount for turning off said limiting transistor.

12. The combination comprising:

a matrix array of radiation sensing elements having M rows and N columns, one of said elements being coupled at the intersection of a row and a column; and sensing elements producing a flow of charge in response to external stimuli;

charge storage means associated with said elements for storing said charges and for developing a potential corresponding to the accumulated charge;

an output shift register having at least N input nodes;

charge transfer circuit means connected between each column and a different one of said N input nodes for selectively transferring signals from said columns to said output register; and limiting means coupled to each one of said columns for during a first time interval preventing the accumulation of charge at said columns and for during a second time interval limiting the maximum level of the potential at said columns due to the accumulation of charge.

* * * * *